United States Patent [19]
Cabaniss et al.

[11] Patent Number: 5,790,394
[45] Date of Patent: Aug. 4, 1998

[54] DUAL AC POWER SUPPLY INPUT MODULE

[75] Inventors: Frank W. Cabaniss, Chapin; Gene F. Young; James S. Kluttz, both of Lexington, all of S.C.

[73] Assignee: NCR Corportion, Dayton, Ohio

[21] Appl. No.: 767,761

[22] Filed: Dec. 17, 1996

[51] Int. Cl.[6] .................................................. H02M 7/155
[52] U.S. Cl. .................................................. 363/65; 307/82
[58] Field of Search .................................. 363/13, 65, 67, 363/84, 123, 125; 307/23, 52, 11, 82

[56] References Cited

U.S. PATENT DOCUMENTS 3,984,750 10/1976 Pfeffer et al. ............................ 363/26
4,239,978 12/1980 Kofink ...................................... 307/16
4,734,844 3/1988 Rhoads ..................................... 363/72
5,638,264 6/1997 Hayashi et al. ........................... 363/65

*Primary Examiner*—Adolf Berhane
*Attorney, Agent, or Firm*—James M. Stover

[57] ABSTRACT

A dual AC input module providing AC line isolation of different phases without the use of relay control. Power supply load is supported through two AC line feeds, each feed being connected through a bridge rectifier to a common bulk DC power supply backplane. The parallel configuration of AC line feeds and bridge rectifiers eliminates the need for relay control logic to open relays and isolate a failed primary AC line feed prior to closing relays to connect a second AC feed to the power supply, as required with previous dual AC input module designs to isolate different line feeds of different phases.

5 Claims, 2 Drawing Sheets

DUAL AC POWER SUPPLY INPUT MODULE

The present invention relates to electrical power supplies and, more particularly, to redundant power supply configurations and a mechanism for switching between primary and secondary AC power supply sources following the loss or restoration of the primary AC power source.

BACKGROUND OF THE INVENTION

Computer systems manufacturers and providers have developed a number of approaches for improving the availability of systems and applications, including the utilization of redundant components, such as power supplies, redundant power supply sources, and power fail protection. Dual AC power source input modules providing redundant AC power supply sources are employed within computer systems, as well as other electronic equipment, to reduce the potential of a system failure resulting from the loss of a sole system AC power source. A dual AC power source input module provides for connection of two independent AC power sources to a computer system. Should either one of the power sources fail, the system's power requirements will continue to be supported through the remaining AC power source.

A typical AC input module design including connections for a primary AC power source 101 and a secondary AC power source 102 is illustrated in the simple block diagram of FIG. 1. Each one of AC power sources 101 and 102 is connected to a common AC power supply backplane 105 through a pair of relays. One or more standard power supplies 107 are connected to power supply backplane 105 which provide for the conversion of standard AC voltage, e.g. 120 volts or 240 volts, into the standard DC voltage levels required by the computer system, typically 12 volts, 5 volts, 3.3 volts, and ground potential. Multiple power supplies 107 may be employed to provide redundancy.

During normal operation, the relays associated with the primary AC power source, relays 111 and 112, are closed to supply AC current and voltage to power supply backplane 105; while the relays associated with the secondary AC power source, relays 121 and 122 are open, isolating source 102 from the power supply backplane. Relay control logic 114 controls relays 111 and 112, and relay control logic 124 operates relays 121 and 122. The relay control logic contains current or voltage sensing circuitry (not shown) to identify a power source failure. Should relay control logic 115 detect a failure of AC power source 101, relays 111 and 112 will be opened isolating the failed source line, and relay control logic 125 will be signaled to close relays 121 and 122 to supply AC current and voltage to internal power supply circuitry 105.

As described above, previous dual AC input module designs depend upon relays switching off a failed AC power source prior to switching on a second pair of relays to connect to a secondary, or back-up, AC power source. This delay is required to prevent out-of-phase power sources from being shorted together. The power supply must be capable of riding through the relay switch-over time while this switch over occurs. There is a potential for a system shut-down during the switch-over time, possible due to a stuck relay contact.

OBJECTS OF THE INVENTION

It is therefore an object of the present invention to provide a new and useful dual AC input module design.

It is another object of the present invention to provide such a dual AC input module design which eliminates the risk of losing AC power redundancy due to relay switch-over time delays following the loss of an AC power source.

It is yet another object of the present invention to provide a new and useful dual AC input module which contains no relay control circuitry, thereby eliminating relay switch over delays.

SUMMARY OF THE INVENTION

There is provided, in accordance with the present invention, an AC power supply input module comprising a first set of line and neutral feeds for connection to a first AC power source; a second set of line and neutral feeds for connection to a second AC power source; a first bridge rectifier having a first AC input terminal for connection to said line feed for said first AC power source, and a second input terminal for connection to said neutral feed for said first AC power source, said first bridge rectifier having first and second DC output terminals providing a DC output voltage upon application of an AC input voltage to said first bridge rectifier's AC input terminals; a second bridge rectifier having a first input terminal for connection to said line feed for said second AC power source, and a second input terminal for connection to said neutral feed for said second AC power source, said second bridge rectifier having first and second DC output terminals providing a DC output voltage upon application of an AC input voltage to said second bridge rectifier's AC input terminals; and a common DC power supply backplane including first and second DC power rails, the first DC output terminals for said first and second bridge rectifiers being connected to said first DC power rail, and said second DC output terminals for said first and second bridge rectifiers being connected to said second DC power rail.

In the described embodiment, the AC power sources are 220 VAC power sources, but may differ in phase. A relay is provided in each line and neutral feed between the AC power sources and bridge rectifiers. Each relay includes a pair of contacts in series with the feed into which it is installed, and an AC coil provided between the line and neutral feeds for the power source to which the relay is connected to sense the presence of an AC voltage across the line and neutral feeds. Each relay is responsive to its AC coil to close its pair of contacts when a sufficient AC voltage is sensed across the line and neutral feeds, and to open the contacts when the AC voltage is not present. An AC power source is thereby automatically disconnected from the common DC power supply backplane upon failure of the source. Fault protection diodes are provided in the connections between the bridge rectifiers and the common DC power supply backplane to prevent connection of the separate AC power source feeds in the event that one of the bridge rectifier diodes shorts.

The above and other objects, features, and advantages of the present invention will become apparent from the following description and the attached drawings.

DETAILED DESCRIPTION OF THE PREFERRED EMBODIMENT

Figure 1:
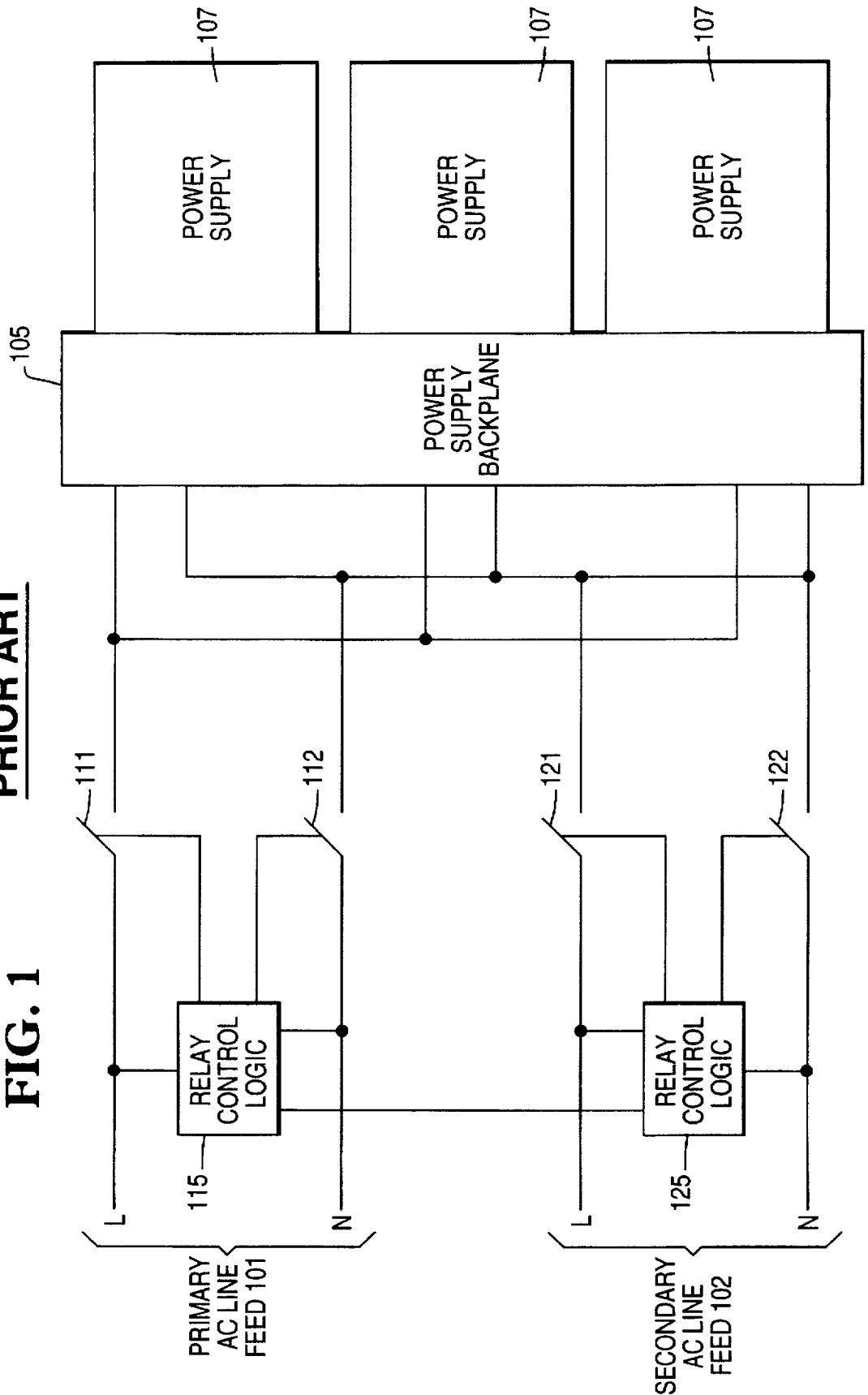
FIG. 1 is a simple block diagram illustration of a typical dual AC input module including relays and relay control circuitry for managing connections to primary and secondary AC power sources.
Figure 2:
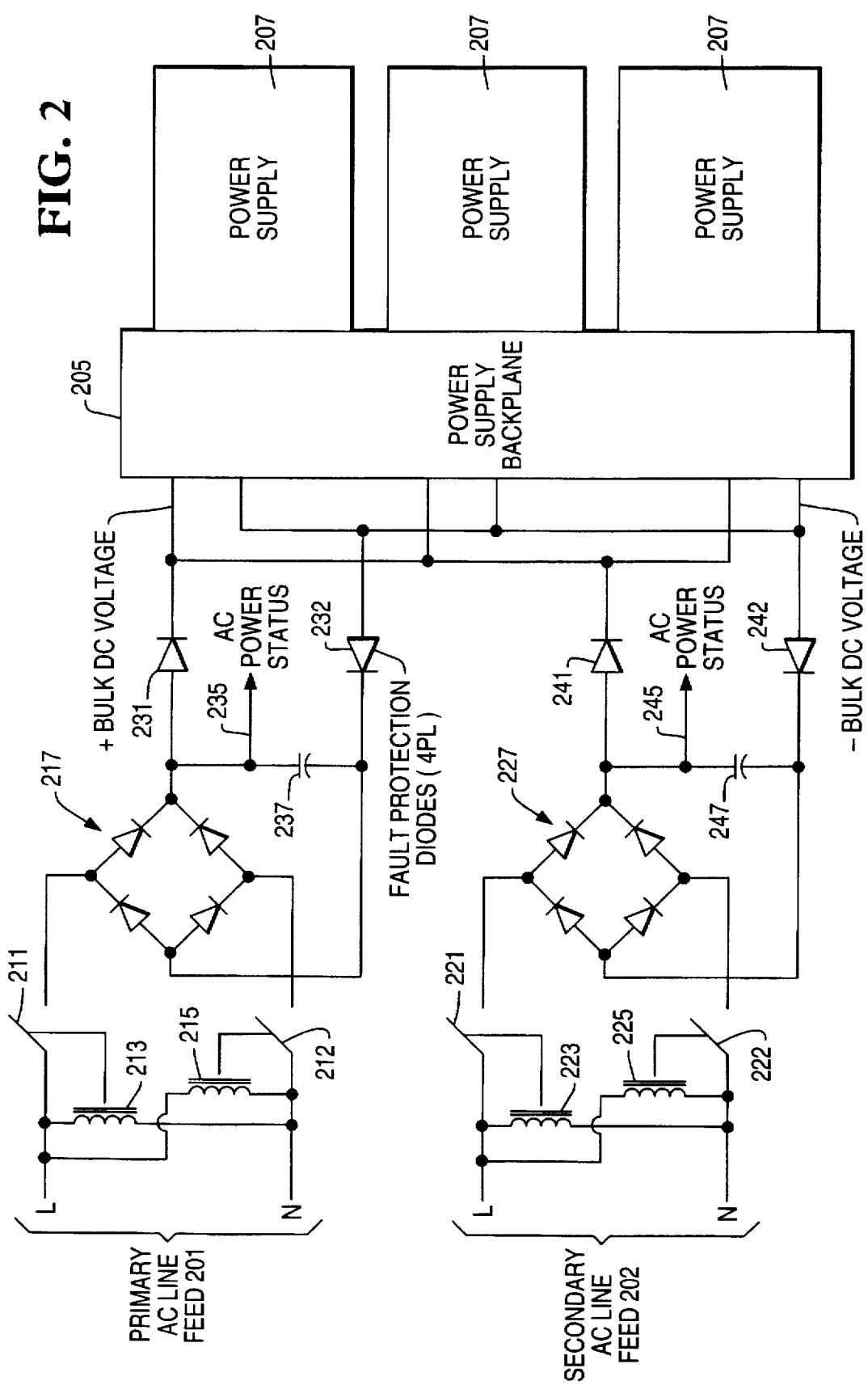
FIG. 2 is a simple block diagram illustration of an improved dual AC input module, eliminating the requirement for relay control circuitry, in accordance with a preferred embodiment of the present invention.

Referring now to FIG. 2, the construction and operation of an improved dual AC input module in accordance with a preferred embodiment of the present invention will now be described. The improved dual AC input module includes connections for a similar voltage first AC and second AC power source 201 and 202, each one of AC power sources 201 and 202 being connected through a bridge rectifier 217 and 227, respectively, to a common bulk DC power supply backplane 205. One or more standard power supplies 207 are connected to power supply backplane 205 providing for the conversion of DC power supply backplane voltage into the standard DC voltage levels required by the computer system, typically 12 volts, 5 volts, 3.3 volts, and ground potential. Multiple power supplies 207 are employed to provide redundancy.

First AC power source 201 is connected to rectifier 217 through relay contacts 211 and 212 provided in the line (L) and neutral (N) feeds connecting source 201 with rectifier 217. Relay contacts 211 and 212 are connected to AC coils 213 and 215, provided between the line and neutral feeds connecting power source 201 with rectifier 217. Each one of relay contacts 211 and 212 is responsive to its AC coil to close when a sufficient AC voltage is sensed across the line and neutral feeds, and to open when the AC voltage is not present.

Similarly, second AC power source 202 is connected to rectifier 227 through relays contacts 221 and 222 provided in the line (L) and neutral (N) feeds connecting source 202 with rectifier 227. Relays contacts 221 and 222 are connected to AC coils 223 and 225, respectively, and responsive thereto to close when AC voltage is provided across the coils, and to open when the AC voltage is not present.

No relay control circuitry is present in the dual AC input module design shown in FIG. 2 and described herein.

During normal operation with both AC power sources active, relay contacts 211 and 212 are closed supplying AC current and voltage from AC power source 201 to bridge rectifier 217. Likewise, relay contacts 221 and 222 are closed supplying AC current and voltage from AC power source 202 to bridge rectifier 227. Thus, both AC sources will share the load current to the system. The parallel connected bridge rectifiers each provide bulk DC voltage to common bulk DC power supply backplane 205. Each one of relay contacts 211, 212, 221 and 222 remain closed as long as an adequate voltage potential is sensed across the line (L) and neutral (N) feeds for each AC power source by corresponding AC coils 213, 215, 223 and 225. Should a source fail, the relay contacts connected to the source will open following the de-energization of the corresponding AC coils. For example, a failure of AC power source 201 would cause AC coils 213 and 215 to de-energize, resulting in the opening of relay contacts 211 and 212. Backplane 205 would remain energized via source 202.

Although separate AC coils are shown for relay contact 211 and 212 and relay contact 221 and 222, a single AC coil may be provided between the line and neutral feeds for power source 201 to operate both contacts 211 and 212, and a single AC coil may be provided between the line and neutral feeds for power source 202 to operate both contacts 221 and 222.

Also shown in FIG. 2 are fault protection diodes 231, 232, 241 and 242, provided to prevent connecting the separate AC power source feeds in the event that a bridge rectifier diode should short. Each source also includes a line fail detection-divider network to an optocoupler that would provide AC power status. Connection for AC power status is provided at taps 235 and 245.

In summary, the improved dual AC input module design can be distinguished from previous dual AC input module designs by the following elements and features:

Four independent relays connect the power system to the dual AC feeds 201 and 202.

The AC coil of each relay is connected across the line and neutral feeds of their associated AC power source.

No relay control circuitry is required when AC is lost on one feed.

Relays are closed whenever AC voltage is present and conversely opened when AC is lost on that line.

Bulk DC voltage (rectified AC voltage) is fed into each power supply's AC input section via bulk DC power supply backplane 205.

Circuit operates from the 110 VAC or 220 VAC lines.

Both AC lines will share the load current to the system.

Fault protection diodes prevent connecting the separate line feeds in the event that one of the bridge rectifier diodes shorts.

Line fail detection - divider network to an optocoupler that would provide AC power status.

Four separate relays allow protection during a single fault condition. If one relay fails to open due to welded contacts, and the AC inlet connection is open to human contact, then there is an incomplete circuit (one relay contact is open), preventing a potential shock hazard.

The power system's efficiency of the improved dual AC input module design described herein may be reduced due to additional losses in the bridge rectifier and fault protection diodes. Additionally, bridge rectifiers 217 and 227 may require cooling to remove heat resulting from the rectifier losses. It is believed that these slight disadvantages are more than offset by the advantages provided through the elimination of relay control circuitry and the switch over delay associated therewith.

It can thus be seen that there has been provided by the present invention an improved dual AC input module design which eliminates the risk of losing AC power redundancy due to relay switch-over time delays when one of the two AC power sources are lost. The dual AC input module design disclosed herein does not depend on relays switching on and off when one AC power source is lost, therefore providing higher system reliability than previous dual AC input module designs.

The improved dual AC input module provides AC line isolation of different phases via bridge rectifiers and does not require relay control. Load sharing from two AC line feeds, by connecting two bridge rectifiers in a parallel configuration, eliminates the need to turn off the relays on one AC feed before turning on the relays to the second AC feed, as required on previous concepts to isolate different line feeds of different phases.

Although the presently preferred embodiment of the invention has been described, it will be understood that various changes may be made within the scope of the appended claims.

What is claimed is:

1. An AC power supply input module comprising:

a first set of line and neutral feeds for connection to a first AC power source;

a second set of line and neutral feeds for connection to a second AC power source;

a first bridge rectifier having a first AC input terminal for connection to said line feed for said first AC power source, and a second input terminal for connection to said neutral feed for said first AC power source, said first bridge rectifier having first and second DC output terminals providing a DC output voltage upon application of an AC input voltage to said first bridge rectifier's AC input terminals;

a second bridge rectifier having a first input terminal for connection to said line feed for said second AC power source, and a second input terminal for connection to said neutral feed for said second AC power source, said second bridge rectifier having first and second DC output terminals providing a DC output voltage upon application of an AC input voltage to said second bridge rectifier's AC input terminals;

a common DC power supply backplane including first and second DC power rails, the first DC output terminals for said first and second bridge rectifiers being connected to said first DC power rail, and said second DC output terminals for said first and second bridge rectifiers being connected to said second DC power rail;

a first set of relay contacts connected in the line feed for said first AC power source, said first set of relay contacts being electrically connected to a first AC coil connected between said line and neutral feed for said first AC power source, said first set of relay contacts being responsive to said first AC coil to close when an AC voltage is provided to the line and neutral feeds for said first AC power source;

a second set of relay contacts connected in the neutral feed for said first AC power source, said second set of relay contacts being electrically connected to a second AC coil connected between said line and neutral feed for said first AC power source, said second set of relay contacts being responsive to said second AC coil to close when an AC voltage is provided to the line and neutral feeds for said first AC power source;

a third set of relay contacts connected in the line feed for said second AC power source, said third set of relay contacts being electrically connected to a third AC coil connected between said line and neutral feed for said second AC power source, said third set of relay contacts being responsive to said third AC coil to close when an AC voltage is provided to the line and neutral feeds for said second AC power source; and a fourth set of relay contacts connected in the neutral feed for said second AC power source, said fourth set of relay contacts being electrically connected to a fourth AC coil connected between said line and neutral feed for said second AC power source, said fourth set of relay contacts being responsive to said fourth AC coil to close when an AC voltage is provided to said line and neutral feeds for said second AC power source.

2. The AC power supply input module in accordance with claim 1, further comprising:

a fault protection diode provided in the connection between each one of said first DC output terminals for said first and second bridge rectifiers and said first DC power rail, and a fault protection diode provided in the connection between each one of said second DC output terminals for said first and second bridge rectifiers and said second DC power rail.

3. An AC power supply input module comprising:

a first set of line and neutral feeds for connection to a first AC power source;

a second set of line and neutral feeds for connection to a second AC power source;

a first bridge rectifier having a first AC input terminal for connection to said line feed for said first AC power source, and a second input terminal for connection to said neutral feed for said first AC power source, said first bridge rectifier having first and second DC output terminals providing a DC output voltage upon application of an AC input voltage to said first bridge rectifier's AC input terminals;

a second bridge rectifier having a first input terminal for connection to said line feed for said second AC power source, and a second input terminal for connection to said neutral feed for said second AC power source, said second bridge rectifier having first and second DC output terminals providing a DC output voltage upon application of an AC input voltage to said second bridge rectifier's AC input terminals;

a common DC power supply backplane including first and second DC power rails, the first DC output terminals for said first and second bridge rectifiers being connected to said first DC power rail, and said second DC output terminals for said first and second bridge rectifiers being connected to said second DC power rail;

a first set of relay contacts connected in the line feed for said first AC power source, said first set of relay contacts being electrically connected to a first AC coil connected between said line and neutral feed for said first AC power source, said first set of relay contacts being responsive to said first AC coil to close when an AC voltage is provided to the line and neutral feeds for said first AC power source;

a second set of relay contacts connected in the neutral feed for said first AC power source, said second set of relay contacts being electrically connected to said first AC coil and being responsive thereto to close when an AC voltage is provided to the line and neutral feeds for said first AC power source;

a third set of relay contacts connected in the line feed for said second AC power source, said third set of relay contacts being electrically connected to a second AC coil connected between said line and neutral feed for said second AC power source, said third set of relay contacts being responsive to said second AC coil to close when an AC voltage is provided to the line and neutral feeds for said second AC power source; and a fourth set of relay contacts connected in the neutral feed for said second AC power source, said fourth set of relay contacts being electrically connected to said second AC coil and being responsive thereto to close when an AC voltage is provided to said line and neutral feeds for said second AC power source.

4. In a power supply input module including a first set of line and neutral feeds for connection to a first AC power source; a second set of line and neutral feeds for connection to a second AC power source; a common power supply backplane including first and second power rails; and at least one power supply connected to said power supply backplane; a method for connecting said AC power sources to said common power supply backplane, the method comprising the steps of:

connecting a first bridge rectifier between said first AC power source and said common power supply backplane, said first bridge rectifier having a first AC input terminal for connection to said line feed for said first AC power source, a second input terminal for connection to said neutral feed for said first AC power source, a first DC output terminals for connection to said first power rail, and a second DC output terminals for connection to said first power rail, said first and second DC output terminals providing a DC output voltage upon application of an AC input voltage to said first bridge rectifier's AC input terminals;

connecting a second bridge rectifier between said second AC power source and said common power supply backplane, said second bridge rectifier having a first AC input terminal for connection to said line feed for said second AC power source, a second input terminal for connection to said neutral feed for said second AC power source, a first DC output terminals for connection to said first power rail, and a second DC output terminals for connection to said first power rail, said first and second DC output terminals for said second bridge rectifier providing a DC output voltage upon application of an AC input voltage to said second bridge rectifier's AC input terminals;

providing a first set of relay contacts connected in the line feed for said first AC power source, said first set of relay contacts being electrically connected to a first AC coil connected between said line and neutral feed for said first AC power source, said first set of relay contacts being responsive to said first AC coil to close when an AC voltage is provided to the line and neutral feeds for said first AC power source;

providing a second set of relay contacts connected in the neutral feed for said first AC power source, said second set of relay contacts being electrically connected to a second AC coil connected between said line and neutral feed for said first AC power source, said second set of relay contacts being responsive to said second AC coil to close when an AC voltage is provided to the line and neutral feeds for said first AC power source;

providing a third set of relay contacts connected in the line feed for said second AC power source, said third set of relay contacts being electrically connected to a third AC coil connected between said line and neutral feed for said second AC power source, said third set of relay contacts being responsive to said third AC coil to close when an AC voltage is provided to the line and neutral feeds for said second AC power source; and providing a fourth set of relay contacts connected in the neutral feed for said second AC power source, said fourth set of relay contacts being electrically connected to a fourth AC coil connected between said line and neutral feed for said second AC power source, said fourth set of relay contacts being responsive to said fourth AC coil to close when an AC voltage is provided to said line and neutral feeds for said second AC power source.

5. In a power supply input module including a first set of line and neutral feeds for connection to a first AC power source; a second set of line and neutral feeds for connection to a second AC power source; a common power supply backplane including first and second power rails, and at least one power supply connected to said power supply backplane; a method for connecting said AC power sources to said common power supply backplane, the method comprising the steps of:

connecting a first bridge rectifier between said first AC power source and said common power supply backplane, said first bridge rectifier having a first AC input terminal for connection to said line feed for said first AC power source, a second input terminal for connection to said neutral feed for said first AC power source, a first DC output terminals for connection to said first power rail, and a second DC output terminals for connection to said first power rail, said first and second DC output terminals providing a DC output voltage upon application of an AC input voltage to said first bridge rectifier's AC input terminals;

connecting a second bridge rectifier between said second AC power source and said common power supply backplane, said second bridge rectifier having a first AC input terminal for connection to said line feed for said second AC power source, a second input terminal for connection to said neutral feed for said second AC power source, a first DC output terminals for connection to said first power rail, and a second DC output terminals for connection to said first power rail, said first and second DC output terminals for said second bridge rectifier providing a DC output voltage upon application of an AC input voltage to said second bridge rectifier's AC input terminals;

providing a first set of relay contacts connected in the line feed for said first AC power source, said first set of relay contacts being electrically connected to a first AC coil connected between said line and neutral feed for said first AC power source, said first set of relay contacts being responsive to said first AC coil to close when an AC voltage is provided to the line and neutral feeds for said first AC power source;

providing a second set of relay contacts connected in the neutral feed for said first AC power source, said second set of relay contacts being electrically connected to said first AC coil and being responsive thereto to close when an AC voltage is provided to the line and neutral feeds for said first AC power source;

providing a third set of relay contacts connected in the line feed for said second AC power source, said third set of relay contacts being electrically connected to a second AC coil connected between said line and neutral feed for said second AC power source, said third set of relay contacts being responsive to said second AC coil to close when an AC voltage is provided to the line and neutral feeds for said second AC power source; and providing a fourth set of relay contacts connected in the neutral feed for said second AC power source, said fourth set of relay contacts being electrically connected to said second AC coil and being responsive thereto to close when an AC voltage is provided to said line and neutral feeds for said second AC power source.

* * * * *